(12) United States Patent
Padan (10) Patent No.: US 7,610,841 B2
(45) Date of Patent: Nov. 3, 2009

(54) SYSTEM AND METHOD FOR ENHANCING THE PAYLOAD CAPACITY, CARRIAGE EFFICIENCY, AND ADAPTIVE FLEXIBILITY OF EXTERNAL STORES MOUNTED ON AN AERIAL VEHICLE

(75) Inventor: Nir Padan, Moshav Sade Yitzhak, Sade Yitzhak (IL) 38840

(73) Assignee: Nir Padan, Moshav Sade Ithak (IL)

( * ) Notice: Subject to any disclaimer, the term of this patent is extended or adjusted under 35 U.S.C. 154(b) by 384 days.

(21) Appl. No.: 10/514,757

(22) PCT Filed: Nov. 21, 2002

(86) PCT No.: PCT/IL02/00933

§ 371 (c)(1),
(2), (4) Date: Nov. 17, 2004

(87) PCT Pub. No.: WO03/097453

PCT Pub. Date: Nov. 27, 2003

(65) Prior Publication Data

US 2005/0204910 A1      Sep. 22, 2005

(30) Foreign Application Priority Data

May 21, 2002    (IL) .................................... 149786

(51) Int. Cl.
*F41F 3/065* (2006.01)
(52) U.S. Cl. .................... 89/1.815; 89/1.8; 244/137.4; 244/118.1
(58) Field of Classification Search ................. 89/1.813, 89/1.8, 1.814, 1.815, 1.816; 244/118.1, 119, 244/136, 137.1, 137.4
See application file for complete search history.

(56) References Cited

U.S. PATENT DOCUMENTS

| | | | | |
|---|---|---|---|---|
| 2,071,594 | A | | 2/1937 | Trimbach .................... 89/1.59 |
| 2,731,885 | A | * | 1/1956 | Nolan ........................ 89/1.815 |
| 2,763,189 | A | * | 9/1956 | Grill .......................... 89/1.817 |
| 2,787,938 | A | * | 4/1957 | Bach .......................... 89/1.816 |
| 2,844,073 | A | * | 7/1958 | Re et al. ...................... 89/1.807 |
| 3,041,937 | A | * | 7/1962 | Toomey ...................... 89/1.814 |
| 3,172,330 | A | * | 3/1965 | Lidmalm et al. ............ 89/1.817 |
| 3,216,322 | A | | 11/1965 | Wengar et al. ............... 89/1.59 |
| 3,315,565 | A | * | 4/1967 | Nash .......................... 89/1.807 |
| 3,342,104 | A | * | 9/1967 | Robert ........................ 89/1.817 |
| 3,412,640 | A | * | 11/1968 | Nash .......................... 89/1.806 |

(Continued)

*Primary Examiner*—Troy Chambers
(74) *Attorney, Agent, or Firm*—Soroker-Agmon Advocates & Patent Attorneys; Daniel Schatz, Patent Attorney (57) ABSTRACT

A system and method for the conversion of fuel tanks, detachably mountable on the exterior of an aerial vehicle, into high volume, high capacity, diverse functionality and aerodynamically efficient airborne stores is disclosed. A conventional external fuel drop tank is modified such that the exterior shape of the tank is substantially retained while the interior of the tank is suitable restructured to allow for the introduction of diverse airborne stores, associated airborne store mounting means, control and monitoring means and support means therein, which replace the fuel store. The airborne store is suitably interfaced to the stores control and management system of the aerial vehicle. The airborne store is integrated into a new external stores configuration The enhanced airborne store will have aerodynamic characteristics substantially similar to the original external fuel tank while its payload capacity is substantially improved.

24 Claims, 5 Drawing Sheets

U.S. PATENT DOCUMENTS

| | | | | |
|---|---|---|---|---|
| 3,456,552 A | * | 7/1969 | Nash | 89/1.817 |
| 3,670,621 A | * | 6/1972 | Nash | 89/1.8 |
| 3,710,678 A | * | 1/1973 | Abelin et al. | 89/1.816 |
| 3,808,941 A | | 5/1974 | Biggs | 89/1.5 R |
| 3,884,118 A | * | 5/1975 | Taylor et al. | 89/1.814 |
| 4,172,573 A | | 10/1979 | Moore et al. | 244/135 R |
| 4,256,012 A | | 3/1981 | Cowart et al. | 89/1.816 |
| 4,412,475 A | * | 11/1983 | Hornby | 89/1.816 |
| 4,429,611 A | * | 2/1984 | Oldham et al. | 89/1.816 |
| 4,679,483 A | | 7/1987 | Wrana | 89/1.51 |
| 5,058,481 A | * | 10/1991 | Drummond et al. | 89/1.816 |
| 5,136,951 A | | 8/1992 | Herrlinger | 102/340 |
| 5,636,813 A | * | 6/1997 | Hardy et al. | 244/118.1 |
| 5,740,985 A | | 4/1998 | Scott et al. | 244/2 |
| 6,012,375 A | * | 1/2000 | Eckstein | 89/1.816 |
| 6,394,392 B1 | * | 5/2002 | Lafferty | 244/118.1 |
| 6,663,047 B1 | * | 12/2003 | Arata | 244/137.1 |

* cited by examiner

SYSTEM AND METHOD FOR ENHANCING THE PAYLOAD CAPACITY, CARRIAGE EFFICIENCY, AND ADAPTIVE FLEXIBILITY OF EXTERNAL STORES MOUNTED ON AN AERIAL VEHICLE

CROSS REFERENCE TO RELATED PATENT APPLICATIONS

This patent application claims priority to Israel Patent Application No.: 149786 filed on May 21, 2002, and International Filing Date Application No.: PCT/IL02/00933 filed on Nov. 21, 2002.

BACKGROUND OF THE INVENTION

1. Field of the Invention

The present invention relates in general to a cost-effective low-risk system and method for enhancing the payload capacity, carriage efficiency and the adaptive flexibility of external airborne stores mounted on an aerial vehicle. More specifically, the present invention relates to a system and method for the conversion of current and prospective external fuel tanks into substantially conformal, diverse functionality, high capacity, high volume, and aerodynamically efficient, externally mountable airborne stores.

2. Description of the Related Art

The majority of military aerial vehicles, such as combat aircraft, attack helicopters and the like, are typically equipped with an external airborne stores suspension, delivery and release system. External airborne stores are devices intended for external carriage, mounted on aircraft suspension and release equipment and may or may not be intended to be separated in flight from the aerial vehicle. External airborne stores typically include missiles, rockets, bombs, nuclear weapons, mines, torpedoes, detachable fuel and spray tanks, chaff and flare dispensers, refueling pods, gun pods, electronic countermeasure (ECM) pods, electronic support measure (ESM) pods, towable target and decoy pods, thrust augmentation pods and suspension equipment, such as racks, eject launchers, drop launchers and pylons. The external stores are detachably installed on the aerial vehicle via specific suspension points, typically referred to as hard points or weapon stations, which are distributed across the external surface of the aerial vehicle in such a manner as to provide for the best possible performance of the stores carried and for the aerodynamically most advantageous flight conditions.

For economical efficiency, as well of for organizational and operational reasons, most military aerial vehicles are designed as multi-role platforms. Consequently modern military aircraft are provided with functional versatility, such as the capability of conducting a variety of missions, including offensive counterair (OCA), defensive counterair (DCA), interception (AA), combat air patrol (CAP), close air support (CAS), suppression of enemy air defenses (SEAD), deep strike, anti-shipping (AS), anti-submarine warfare (ASW), electronic warfare (EW), refueling, reconnaissance, surveillance, Unmanned Aerial Vehicle (UAV) launching, satellite launching or the combination of two or more of the above. Each specific mission profile requires weapon pairing or the assignment of optimal weaponry for the given mission. Weapon pairing involves the delivery of a particular load of a particular store or a specific mix of different store types and loads. The wide range of mission profiles required from modern military aerial vehicle necessitates the option of carrying a variety of stores and loads.

Modern multi-role aircraft are provided with weapon stations to accommodate a variety of stores required for the conduct of many different missions. Although the number of the available stations differs among different types of aircraft typically eight to twelve stations are provided. As payload space is at premium in a combat aircraft or in an attack helicopter, the location of the stations is typically limited to the external, lower surface of the aerial platform. Due to increased aerodynamic drag effects the external location of weapon stations carrying stores inevitably involves flight performance penalties, such as reduced maneuverability, airspeed, range, effective operational ceiling, increased fuel consumption and the like. Typical external weapon station locations include wing tip hard points, outer wing hard points, middle wing hard points, inner wing hard points, side fuselage hard points, fuselage center line hard points, and the like. Although each hard point allows for a limited set of options for the uploading of stores the overall stores configuration can be mixed or matched in accordance with the type of aircraft. An allowed combination of stores and loads in the framework of a single sortie is typically referred to as the external stores configuration. It is important to note that typically all stores on a particular hard point must be of the same type for a given configuration.

Thus, for example, an exemplary stores configuration could include medium-range missiles on the wing tip hard points, rocket pods on the outer wing hard points, bombs on he middle wing hard points, ECM pods on the inner wing hard points, short-range missiles on the side fuselage hard points, and external fuel tanks on the fuselage center line hard points. Although, the various types of stores deliverable and releasable by a single aerial platform is quite large, the number of possible stores configurations is substantially limited both by the number of weapon stations and by permissible weapon station loading options.

Typically, a military aircraft performing a long-range sortie or a mission involving an extended operational activity period, is equipped with auxiliary external fuel tanks, which are commonly secured to pylons suspended on specific hard points. Due to considerations concerning aerodynamic efficiency and the associated flight performance parameters the external fuel tanks are designed to have a suitable structural configuration, such as the characteristic torpedo shape. Typically external fuel tanks are manufactured in diverse sizes that allow for a wide range of fuel store capacities ranging from 67 to 1,360 US gallons per tank unit. External fuel tanks are usually the largest external payload carried by an aerial vehicle. The number of external drop fuel tanks carried by an aerial vehicle differs according to the vehicle type and the variants thereof, but typically one to five external fuel tanks are supported where two or four tanks are carried under the wings and one or two tanks are installed under the fuselage.

The delivery of aerial vehicles to a user (e.g. an Air Force) where the vehicle has the capacity of carrying external stores, such as weapon stores or fuel stores, inherently includes the provision of the optional external configurations where the carriage of the stores and the associated operation parameters were designed, tested and certified by the manufacturer prior to the operational fielding of the aerial vehicle. As a result, the aerodynamic and operational characteristics of a typical external fuel tank are optimal within the certified external configurations and in association with the aerial vehicle. The typical fuel tank characteristics include high capacity carriage, substantially flexible center of gravity limits and ranges, acceptable flutter, high load limits, positive dynamic separation and emergency release effects, known aerodynamic effects on the aircraft stability and maneuvering, known aerodynamic effects on the adjacent external stores and the like.

Note should be taken that certain external store types, such as multiple unit weapons, cluster bombs, ECM, ESM, and the like, are not provided with an optimal aerodynamic shape. Therefore, such weapon stores are aerodynamically unstable, produce increased drag and negative dynamic separation and release effects.

Strategic and tactical demands in concert with the ever-accelerating pace of technological progress motivate a continuous program of improvements in the operational capacity of military aerial vehicles. Although the development of a completely new aerial platform is an extremely long and highly expensive process, substantial enhancement to the capabilities of an existing platform can be accomplished by progressive development and new operational implementation of new/upgraded stores involving the introduction of new/upgraded external stores configurations. Since a typical combat aerial vehicle in service today is already operating at the edge of its flight characteristics envelope the addition of external payloads with a high drag index has a negative impact on the flight performance characteristics, such as increased turn radius and fuel consumption, reduced climb rate, maneuverability, turn rate, airspeed, operational range, effective operational ceiling, and the like. Based on these physics of flight it is can be readily assumed that a new/upgraded stores configuration will have some negative impact on the flight characteristics of the platform, in order to avoid potential damage to the high-value aerial vehicle and to the crew manning the aircraft it is imperative that each and every new/upgraded store configuration will be submitted to a series of comprehensive ground-based and in-flight tests in order to evaluate the aerial vehicle stores compatibility of any given configuration. The new/upgraded configuration is certified and approved for operational use only after the suitably collected test data proves the safe operability of the configuration.

The tests must evaluate the flight characteristics of an aerial vehicle resulting from the implementation of a new/upgraded stores configuration. The behavior of the platform in association with the tested stores configuration must be systematically evaluated by performing ground-based tests (engineering analysis, computer simulation, wind tunnel testing) and subsequent flight tests to be executed under a variety of flight conditions. The tests address such vital issues as safe stores carriage, safe stores release, safe carriage of combined stores, safe release of combined stores, emergency release, dynamic release and separation effects, weapon delivery accuracy, ballistic accuracy, limitations in the center of gravity range and margins, additional load effects, flutter, drag, aerodynamic stability and balance, size of radar and infrared signatures, and the like. Data collected during flight tests is in regard with the behavior and the performance of the platform in the variety of cases from a full loaded store configuration up to an asymmetric configuration resulting from partial store release, from unintended store release, and the like. If in any of the testing stages the results indicate unacceptable flight envelope deterioration or unacceptable functioning of the stores, then suitable structural modifications will be made on the stores, in the stores configuration or even in the aircraft frame and the tests are repeatedly performed. At the completion of the testing process, in accordance with the test data collected, the new/upgraded stores configuration is either certified, that is approved for operations by an appropriate certification board or is rejected as unsuitable for operations until further changes are made. It would be easily understood that the entire ground-based tests, flight tests and certification procedure loop is a highly complex, substantially cumbersome, and time-consuming process that involves very high expenses and very high risks.

Currently a new generation of advanced, powerful, miniaturized munitions is being developed and introduced. The utilization of these advanced weapon types, such as small smart bombs, and the like, is highly advantageous in terms of increased accuracy, reduced volume and weight and superior effectiveness. One disadvantage of the miniaturized munitions relates to the associated carrier means, such as unique miniaturized munitions-specific pods that are used as unique containers for the new weapons. The unique miniaturized munitions-specific pods have a limited payload capacity, aerodynamic inefficiency, high drag and negative dynamic release and separation characteristics. An additional drawback of the miniaturized munitions pertains to the fact that a particular weapon station is capable of supporting only one particular type of store for a specific mission. Thus, by necessity, a single miniaturized munitions-specific pod typically occupies an entire available weapon station, which is capable of supporting much higher loads. Due to the limited number of the weapon stations and the significantly reduced weight of the miniaturized munitions, the implementation of a stores configuration containing miniaturized munitions may result in the potential dissipation of the stores suspension potential and payload capacity potential of an aerial vehicle that was typically designed to support much higher loads.

It would be easily perceived by one with ordinary skill in the art that there is an urgent need for a cost-effective and low-risk system and method that would provide substantially more efficient payload capacity and substantially enhanced stores configuration flexibility for the majority of the current and prospective military aerial vehicles. The system and method should preferably exploit in the most advantageous manner the stores carriage potential of the aerial vehicles in an aerodynamically most effective manner. The system and method should flirter provide for the uploading of diverse stores having a substantially high volume that substantially preserves the aircraft's flight envelope without substantially increasing the radar/infrared signature of the vehicle. The system and method should provide the option of combining different stores carried on a single weapon station. The implementation of the system and method should further involve none or a minimum of airframe modifications, a minimum of stores management and control system changes, low costs, low risks, minimum training, and simplified, rapid, low-cost, low-risk testing, evaluation, and certification procedures.

BRIEF SUMMARY OF THE INVENTION

One aspect of the present invention regards a system for converting a fuel tank mountable on the exterior of an aerial vehicle to an airborne store assembly adapted to the storage, suspension, delivery, and release of one or more airborne stores. The system consists of an aerodynamically shaped structure to surround the at least one airborne store, to provide enhanced, volumetric efficiency, reduced drag effect, optimal flight performance characteristics, and optimal radar and infrared cross-section, at least one interior airborne store mounting means attached to the internal surface of the aerodynamically shaped enclosure to provide stability to the at least one airborne store, at least one airborne store operation control means linked to the at least one airborne store to monitor and control the operation of the at least one airborne store, at least one airborne store operation support means to provide for the maintenance, loading, unloading and release of the at least one airborne store, at least one airborne store operative in achieving the aims, functions and objectives of an aerial mission performable by an aerial vehicle.

A second aspect of the present invention regards a method for converting a fuel tank mountable on the exterior of an aerial vehicle to an airborne store assembly adapted to the storage, suspension, delivery, and release of one or more airborne stores. The method consists of removing the fuel store supporting devices from the internal space of the fuel tank to allow for the insertion and attachment of the elements of at least one airborne store, structurally strengthening the fuel tank to maintain aerodynamic shape and characteristics, and to handle the loads associated with the introduction of the elements of the at least one airborne store, attaching airborne store mounting means to the internal space of the strengthened fuel tank, introducing airborne store controlling and monitoring means to the internal space of the modified fuel tank, implementing airborne store support means to the modified fuel tank and functionally interconnecting the, airborne store mounting means and the airborne store control means.

All the above aspects of the present invention provide aerial vehicles having airborne stores mounted externally thereon with enhanced volumetric efficiency stores.

All the above aspects of the present invention provide aerial vehicles having airborne stores mounted externally thereon with enhanced stores payload capacity stores.

All the above aspects of the present invention provide aerial vehicles with substantially enhanced external stores configuration flexibility.

All the above aspects of the present invention provide aerial vehicles with improved external stores having reduced aerodynamic drag effect.

All the above aspects of the present invention provide for a cost-effective, simplified, low risk configuration testing and configuration certification procedures requisite for the introduction of external store configurations.

The above-described objects, as well as other features and advantages of the present invention, will be appreciated and understood by those skilled in the art from the following detailed description, drawings, and appended claims.

BRIEF DESCRIPTION OF THE SEVERAL
VIEWS OF THE DRAWINGS

Various advantages of the present invention will become apparent to one skilled in the art by reading the following specification and subjoined claims and by referencing the following drawings in which:

| ABBREVIATIONS AND ACRONYMS | |
|---|---|
| AAA | Air-to-Air Missile |
| CSDC | Chaff Storage and Delivery Channel |
| ECM | Electronic Counter Measures |
| EECMA | Expendable Electronic Counter Measures Assembly |
| EO | Electro-Optical |
| ESM | Electronic Support Measures |
| GCS | Ground Control Station |
| HOTAS | Hands-on-Throttle-and-Stick |
| MAV | Micro Aerial Vehicle |
| MicroSAT | Micro-Satellite |
| MSDR | Micro-Satellite Delivery Rocket |
| OCS | Orbital Control Station |
| PGM | Precision Guided Munitions |
| SCC | Stores Control Console |
| SBS | Small Bomb System |
| SMS | Stores Management System |
| TARA | Tactical Air Reconnaissance Assembly |
| TER | Triple Ejector Rack |
| UCAV | Unmanned Combat Aerial Vehicle |
| UAV | Unmanned Aerial Vehicle |

DETAILED DESCRIPTION OF THE INVENTION

A system and method for the enhancement of the payload capacity and the stores configuration flexibility of a military aerial vehicle is disclosed. An external fuel tank is known in the art as an auxiliary fuel storage device commonly utilized for the carrying of auxiliary airborne fuel store to provide for extended radius of action, augmented operational range and longer loiter times and thereby enabling the aircraft to remain on station for longer periods. The uploading of one or more external fuel tanks to an aircraft in the framework of a specific external stores configuration is tested, evaluated and certified following the performance of a series of tests during the design, development and manufacturing process. The system and method of the present invention proposes converting operatively a current or prospective external fuel drop tank, previously certified aircraft-store compatible external payload, into a substantially conformal high-capacity, high-volume functional external stores pod. Thus, the operatively transformed tank device will have proven aerodynamic properties, a substantially known impact on the flight characteristics of the aircraft and pre-installed basic supporting systems. The conversion procedures consist of adapting the external fuel tank-aircraft interface to the requirements of the stores system, adapting the pylon to the new functionality, re-structuring the fuel tank to the new functionality, and enhancing the internal stores management and control systems (data bus, stores management system (SMS), stores control interface) such as to provide additional controlling and monitoring functions. The objective of the modifications is to integrate one or more stores, stores supporting means, and stores control means into a high volume external stores pod substantially conformal to an existing of prospective external fuel tank in order to provide for the upload, storage, control, monitoring, delivery and activation of the stores at a depot, at a rearming area, at pre-flight time, during the flight course to a hostile target, and within the weapon range of a hostile target respectively. The integration is accomplished by performing appropriate modifications in the structure of a current or prospective external fuel tank while retaining the original aerodynamic shape thereof, in the structure of the fuel tank carrier assembly, in the pylon, in the pylon-to-airframe interface, in the data bus, in the stores management system (SMS) implemented in the aircraft computer device), and in the stores control console (SCC). Consequently the stores loading capability, the external stores configuration efficiency, and flexibility of the aerial vehicle will be substantially enhanced. As the original external fuel tank is already certified for operational use, the required testing/certification procedure concerning the substantially conformal high volume stores pod will be faster, more cost-effective, substantially simpler and will involve significantly reduced risks in comparison with a parallel procedure regarding a specifically developed and uniquely constructed store having an entirely new design and structure, and unknown aerodynamic properties.

The improved, high volume, external stores pods could carry significantly increased loads of one or more currently operational or prospective stores, such as missiles, conventional iron bombs, precision-guided munitions (PGM), smart bombs (SBS), Electronic Counter Measures (ECM), Electronic Support Measures (ESM), surveillance and reconnaissance assemblies, guns, unmanned miniature aerial and space vehicles (micro-UAVs, micro-satellites), and the like. The pods are designed to be carried on one or more pre-defined and specifically adapted weapon stations. Practically the entire range of the current or prospective military aerial platforms having the capability of carrying external fuel tanks could be retrofitted with the high volume stores pods, such as combat aircraft, attack aircraft, combat helicopters, tactical and strategic bombers, transport aircraft and transport helicopters, UCAVs, dual role (manned-unmanned) aircraft trainer aircraft, and the like. The major aerial vehicle models that could benefit from the concepts of the present invention may include the McDonnell Douglas. F-15 Eagle, the Lockheed Martin F-16 Fighting Falcon, the Northrop Grumman Corp. F-14 Tomcat, the MAMS/Northrop Grumman F-18 Hornet, the Dassault-Breguet Mirage 2000, the Dassault Aviation Rafale, the Sukhoy SU-27 Flanker, the Sukhoy SU-35 Super Flanker, the MIG MAPO MIG-29 Fulcrum, the Fairchild Republic Corp. A-10 Thunderbolt, the British Aerospace/DASA/Alenia Tornado, the British Aerospace/Dassault-Breguet BR.2 Jaguar, the British Aerospace/Boeing AV-8B Harrier, the Saab/British Aerospace JAS-39 Gripen, the Saab S-35 Draken, the Alenia/BAe/CASA/DASA EF2000 Eurofighter Typhoon, the Lockheed Martin F-35 Joint Strike Fighter (JSF), the Boeing AH-64 Apache, the Sikorsky UH-60 Black Hawk, the Bell AH-1Z Super Cobra, the Kamov KA-52 Hokum-B, the Bell/Boeing V-22 Osprey, the MIL Mi-28 Havoc, the Lockheed Aeronautical System AC-130 Hercules, the General Atomics RQ-1 Predator, the Northrop Grumman RQ-4A Global Hawk, and the like.

In order to illustrate the wide range of stores that could be integrated into the new high volume external stores pod several embodiments of the present invention will be described hereunder. In order to provide a cohesive view of the salient features of the present invention, a single exemplary aircraft will be described across the preferred embodiments as the representative aerial platform that could substantially benefit from the proposed system and method. The representative vehicle selected is the General Dynamics/Lockheed Martin F-16 Fighting Falcon multi-role class A fighter, a modern aircraft that is presently operational in eighteen major air forces around the globe, such as the United States Air Force, The United States Navy, the United States Air National Guard, the majority of NATO Air Forces, Middle Eastern Air Forces, and Asian Air forces. The F-16 is highly popular because of its superior technical qualities, small size, relatively low price, effectiveness, survivability, reliability, high combat-readiness rates, and compatibility with most current weapons systems. The F-16 is a highly representative specimen of a large group of modern supersonic multi-role fighter aircraft that could readily benefit from the concept underlying the present invention since the entire group is capable of carrying and delivering a wide range of similar or equivalent stores, of carrying several auxiliary fuel stores within external fuel drop tanks, have sophisticated avionics, advanced aircraft crew interfaces, significant data processing capabilities, and the like. In addition, the manner of application of the present invention and the required conversion procedures needed in regard to the F-16 are similar to the application of the invention to the group of similar technologically advanced aircraft.

The F-16 is also a suitably representative aerial platform regarding the main problem that the proposed system and method of the present invention addresses. During its lifetime the F-16 was often criticized in regard of its low mission profile versatility, stores payload limitation and mission range limitation. Although specific phased upgrades and continuous improvements significantly alleviated these limitations the basic problem still exists. It should be noted that the aircraft was designed as a fighter and therefore in its original role, the air-to-air combat, the platform is highly competitive being able to carry up to six Air-to-Air Missiles (AAMs) in different combinations and one ECM pod. In contrast, in ground interdiction missions the F-16 is limited to carry just four pylons that can be used for offensive weapons with the other pylons reserved for extra fuel tanks, self-defense AAMs and ECM pods. Consequently, by adopting the system and method of the present invention the vehicle could be provided with substantially enhanced payload capacity and stores configuration flexibility and thereby could significantly expand the range of the effective mission profiles associated therewith.

It should be stressed that the F-16 as the representative carrier platform and the representative store types described across the various preferred embodiments are exemplary only and not meant to be limiting as the list of aerial vehicles that the proposed system and method could be applied includes practically all military aerial vehicles in service, as well as a wide variety of new generation aerial vehicles in design, development, or testing stages. The system and method could also pertain to various specialized civilian aircraft utilized for search and rescue, fire fighting, humanitarian missions, scientific research, micro vehicle launching, and the like.

The next generation of the military aircraft being currently developed includes stealth aircraft, which is a special case in regard to the concepts underlying the system and method proposed by the present invention. In the current state of stealth technology a stealth aircraft carries stores internally to optimize the radar cross-section and the infrared profile of the platform as much as possible. It is highly probable that in the near future the technology will advance such that external payloads such as externally mounted stores could be substantially stealth-configured (using specialized structure geometry, radar absorbing construction materials and coatings). When such a technology becomes practical then stealth aircraft would be able to carry external stealth-configured stores without compromising the stealth characteristics of the platform. In such a scenario the principles of the present invention could readily apply to future stealth aircraft as well.

Figure 1:
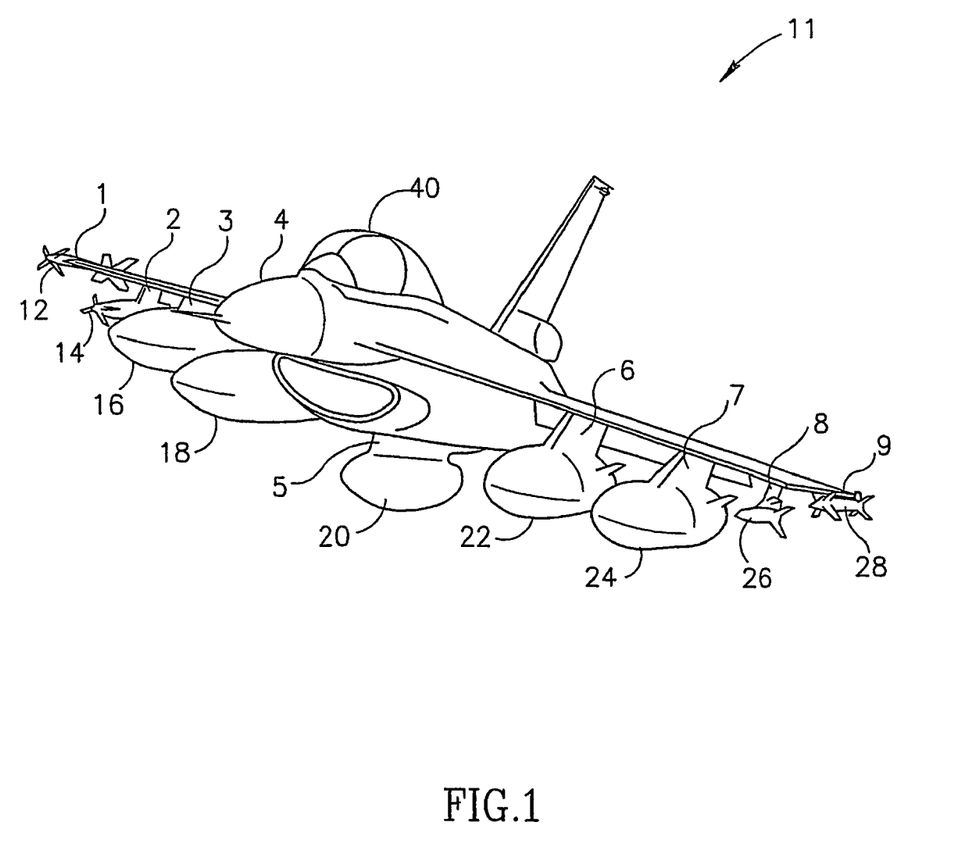
FIG. 1 is a perspective view of an aircraft illustrated to include a plurality of loaded weapon station in a specific stores configuration, in accordance with the preferred embodiments of the present invention.

Reference is made now to FIG. 1 illustrating a specific external stores configuration of an F-16 aircraft, in accordance with the first preferred embodiment of the invention. The drawing shows an aircraft 11 carrying diverse stores uploaded on the standard weapon stations thereof. The weapon stations are designated in the standard manner by the numerals 1, 2, 3, 4, 5, 6, 7, 8, and 9 from the right to the left. The selected and implemented external stores configuration is operative in the performance of an air superiority mission and carries specifically selected stores operative in the accomplishment of the mission's objectives. The stores configuration includes two defensive counter-air missiles 12 and 28, such as the AIM-9 Sidewinder, uploaded on the wing tip stations 1 and 9 respectively, two AAM missiles 14 and 26, such as the AIM-120 AMRAAM, on the outer wing weapon stations 2 and 8 respectively, two standard external fuel drop tanks 18 and 22, such as a 370-gallon fuel tank, on the inner wing stations 4 and 6 respectively, an ECM pod 20, such as the AN/ALQ-119, on the fuselage center line station 5, and two high volume chaff dispenser pods 16 and 24 converted from and substantially conformal to the standard external fuel tanks, such as a 370-gallon fuel tank, on the middle wing stations 3 and 7 respectively. It is important to note that the suspension and carriage of external fuel tanks on the stations 3 and 7 is not certified presently. Stations 1, 2, 3, 4, 5, 6, 7, 8, and 9 are under the operational control of the aircraft crew located in the cockpit 40. The crew is interfacing with the weapon stations via an appropriate stores control interface located in the cockpit. The stores control interface consists of HOTAS (Hands-on-Throttle-and-Stick) components, audio components, and stores control console (SCC) components interconnected with diverse weapon systems and incorporating suitable monitoring and activation devices, such as LED status displays, digital display counters, illuminated push button switches, toggle switches, rotary switches, multi-payload displays, earphones, and the like. The SCC provides power application, operational control of the stores delivery system and visual indications concerning the status of thereof. The SCC is interconnected with the weapon stations 1, 2, 3, 4, 5, 6, 7, 8, 9 via an onboard computer device (not shown), such as a microprocessor, a data bus including suitable data links (not shown), such as internal communication cables, and fuel lines (not shown) carrying the content of the auxiliary fuel store from the standard external fuel tanks 18 and 22 to the engine of the aircraft 11. The drawing clearly shows that the external shape or contour of the high volume external stores pods 16 and 24 is practically identical to the shape of the standard external fuel tanks 18 and 22. As a result the geometry of the high volume stores pods 16, 24 are practically identical to the geometry of the external fuel tanks 18, 22. It would be readily perceived by one with ordinary skills in the art that the illustrated configuration is exemplary only.

Although sophisticated and expensive jamming systems were developed in recent years, the dispersal of massive quantities of chaff remains the most effective area defense against radar directed threats. Chaff is an expendable electronic countermeasure device utilized by practically all types of military aerial vehicles for the purpose of confusing hostile missile guidance and fire control systems by creating false RF signals effective in cluttering fire-control radar and decoying RF-guided missiles. A chaff dispenser is a device operative in the storage, the control, and the dispersion of chaff, which consists of small metallic dipoles, such as aluminum-impregnated fiberglass, designed to resonate at the radar's frequency. A plurality of such dipoles are compressed into small packages that could be stored into heat-resistant canisters, cartridges, or other containers and are typically ejected from the storage devices by explosive impulse charges. Chaff could be dispensed also by the direct ejection of the chaff packages from a chaff dispenser device by the utilization of electromechanical means. When injected into the aircraft slipstream, the chaff packages burst open and the dipoles scatter to form a lingering radar-reflective cloud. Chaff misdirects hostile attacks in a direct defensive manner. When an ECM monitoring system, such as a radar warning receiver having in-built extensive identification and threat evaluation functions, identifies a radar lock on the aircraft, the aircraft crew is suitably notified and one or more rounds of chaff is fired off creating an image on the radar, which is similar to the image of the aircraft. If the decoying process is successful then the hostiles will fire on the false image instead of the aircraft.

A significant drawback associated with the utilization of chaff as an effective ECM is the fact that current chaff dispensing solutions are inefficient. Presently, the amount of chaff carried by a single F-16 aircraft is substantially limited. Chaff in limited quantities is effective only for a short range and period, as the deploying aircraft typically leaves the protective area soon after the deployment of the chaff. To be sufficiently effective chaff should be typically dispensed at a high rate and therefore a single aircraft usually expends its entire chaff load within minutes leaving the aircraft without protection against radar directed threats. The system and method proposed by the present invention provides a significantly increased chaff payload capability that is about from 150% and up to 400% greater than the current capacity of the existing dispensing systems and will consequently allows for fewer aircraft to provide more effective protection against radar directed threats.

Figure 2:
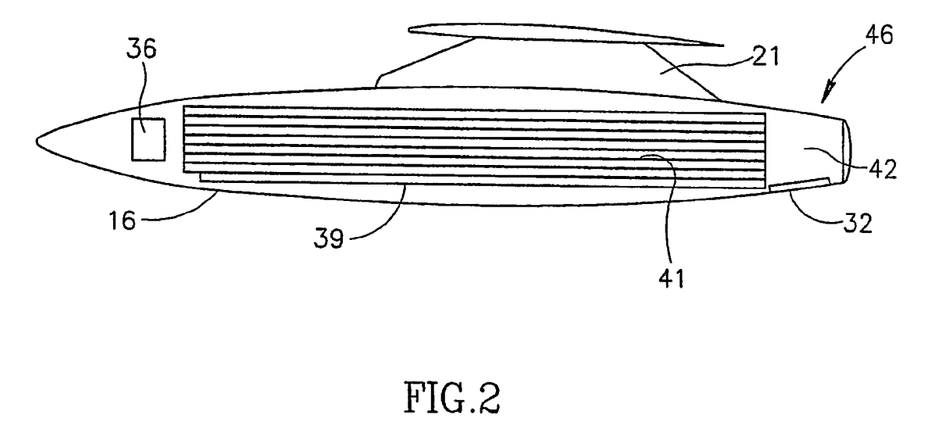
FIG. 2 is a cross-sectional side view illustrating an external fuel tank converted into a substantially conformal high-volume chaff dispenser pod uploaded on a weapon station of an aircraft, in accordance with the first preferred embodiment of the present invention.

Referring now to FIG. 2 that shows a high volume chaff dispenser pod 16 that was converted from and is substantially conformal to a standard external fuel tank, such as a 370-gallon tank or a 600-gallon tank. The high volume chaff dispenser pod 16 is secured to a hard point on the aircraft wind underside area via a streamlined, fitted strut pylon 21 suitably adapted to the carriage of the pod 16. The pod 16 is electrically interconnected with the appropriate HOTAS/SCC components in the cockpit 40 of the aircraft 11 via the pylon-airframe interface, via a suitable data bus, and via the onboard computer device. The conversion of the external fuel tank to the high volume chaff dispenser pod is accomplished by the complete re-configuration of the internal structure of the tank in order to accommodate a chaff dispensing assembly while generally retaining the external shape of the fuel tank. The tank structure is strengthened up to handle the loads associated with the accommodation of the chaff dispenser assembly therein. The chaff dispensing assembly is an electronic counter measures device operative in the dispersion of chaff. The assembly includes a high volume chaff magazine 39, an electrical control box 36, one or more chaff dispersal doors 32, one or more air intakes 70, a chaff dispersal chamber 42, a chaff deflector device 33 and a removable chaff loading section 46. The chaff magazine 36 is a rigid structure semi-permanently attached to the internal surface of the high volume chaff dispenser pod 16. The chaff magazine 39 includes a housing, a supporting frame, and several elongated chaff storage and delivery channels (CSDCs) 41. The chaff packages are pre-loaded manually into the channels 41 in a sequential manner effecting the formation of a horizontally disposed stack of chaff packages in the channel 41 where the stack is supported by the internal surfaces of the channel 41. Each channel 41 is associated with an electro-mechanical drive mechanism utilized for driving the chaff packages towards the chaff dispersal chamber 42 and the chaff dispersal doors 32. The drive mechanism includes an actuator device (not shown), such as an electric motor, a pressure plate, drive wheels, and a drive belt (not shown). The actuator imparts motion to the pressure plate via the drive wheels and the drive belt. The pressure plate is deployed such that it is in close contact with the foremost chaff package of the horizontally stacked chaff packages within the channel 41. When an actuator device associated with a specific CSDS 41 is activated, force is imparted by the actuator to the pressure plate in order to transmit motion in the aft direction to the entire stack of the horizontally loaded chaff packages within the CSDC 41. As a result the entire horizontally loaded stack of chaff packages is fed rearward towards the chaff dispersal chamber 42 and the chaff dispersal doors 32. When a particular chaff package enters the chaff dispersal chamber 42 it is ejected from the CSDC 41 through the chaff dispersal chamber 42 and the chaff dispersal doors 32, by the pressure of the horizontally loaded stack. The package enters the air stream turbulence below and aft the pod 16 and breaks up. Consequently, the packaged dipoles within the chaff package are dispersed in the air and effect the creation of a chaff cloud.

When in the course of a combat mission a radar warning receiver device (typically integrated into the ECM pod 20) generates a suitable indication concerning an identified radar directed threat, the aircraft crew is suitably notified via an appropriate display component of the SCC or by a suitable audio signal. Consequently the chaff dispensing system incorporated into the high volume chaff dispenser pod 16 is operationally activated and one or more chaff packages are ejected from the pod 16 in order to create false RF signals. The activation could be made manually, automatically, or semi-automatically. The activation of the system and the ejection of the chaff involve the opening of the chaff dispersal doors 32 and the activation of an automatically selected CSDC 41 actuator device. The sequence of dispersion is controlled by the electronic control box 36. The dispersion sequence is arranged such as to ensure that the balance of the aircraft is maintained across the complete dispersion process.

The high volume chaff dispenser pod 16 converted from standard external fuel tanks and accommodating chaff magazines provides a substantially enhanced chaff storage and delivery capacity over the current solutions. The pod 16 could provide a total chaff capacity of about 1000 lbs. Thus, the total chaff payload for a single aircraft equipped with two chaff dispenser pods 16 could be about 2,000 lbs. A fully loaded high volume chaff dispenser pod 16 accommodating the chaff magazine will weigh about 1900 lbs in contrast to a fully loaded external fuel tank that weighs about 4250 lbs. The system and method proposed by the present invention enables chaff dispersal rate of about 10 to 15 lbs./second.

It would be easily perceived by one with ordinary skills in the art that the structure, operation, dimensions, weight, quantities associated with the high-capacity chaff dispenser pod and provided in the foregoing are exemplary only and were introduced merely for the ready understanding of the first embodiment of the present invention.

Figure 3A:
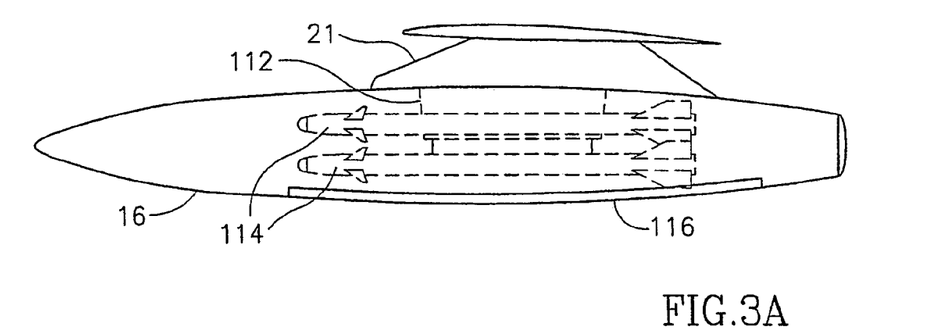
FIG. 3A is a cross-sectional side view of an external fuel tank converted into a substantially conformal missile launcher pod uploaded on a weapon station of an aircraft, in accordance with the second preferred embodiment of the present invention.
Figure 3B:
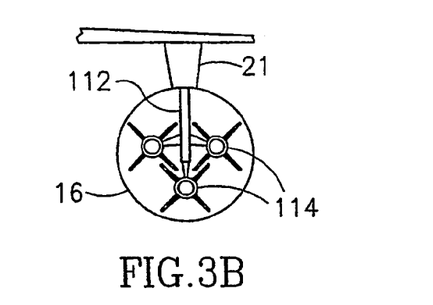
FIG. 3B is a cross-sectional rear view of an external fuel tank converted into a substantially conformal missile launcher pod uploaded on a weapon station of an aircraft, in accordance with the second preferred embodiment of the present invention.

Referring now to FIG. 3A and 3B showing a conventional external fuel tank, such as a standard 600-gallon fuel tank, that was converted into a substantially conform a high volume missile launcher pod 16. The pod 16 accommodates a triple missile launcher assembly 112, in accordance with the second preferred embodiment of the present invention. The high volume missile launcher pod 16 is shown uploaded on a pre-determined weapon station of an F-16 fighter aircraft. Typically an F-16 aircraft is capable of carrying up to six air-to-air missiles in various combinations. The proposed system and method enable the uploading of additional missiles installed within one or more high volume missile launcher pods 16 without substantially modifying the flight envelope of the aerial vehicle. In the second preferred embodiment of the present invention the missiles carried within the high volume missile launcher pod 16 are of the AIM-9 Sidewinder type although it will be easily perceived that the present embodiment of the invention could apply to other missiles, such the Magic R550, the AM-7 Sparrow or the Python 4. The AIM-9 is a supersonic, heat-seeking, air- to-air missile carried by a plurality of fighter aircraft. The AIM-9 has a high-explosive warhead, an active infrared guidance system, and a cylindrical body with a roll-stabilizing rear wing/rolleron assembly, the infrared guidance head enables the missile to home on a target aircraft exhaust and can be used in daytime, in nighttime and under electronic countermeasure conditions. The infrared seeker also permits the pilot of the aircraft to launch the missile, then leave the area or take evasive action while the missile guides itself to the target. The high volume missile launcher pod 16, converted from a standard external fuel drop tank, includes three AIM-9 missiles 114 carried on three respective launcher rails on a triple missile launcher assembly 112. The triple missile launcher assembly 112 provides side-by-side and canted side-by-side carriage and the launching of three missiles 114. The housing of the high volume missile launcher pod 16 includes two oppositely outward opening missile launcher doors 116 that extend along the entire length of the high volume missile launcher pod 16 in order to enable the loading of the missiles 114 into the pod 16, the detection of the hostile targets by the infrared seekers while the missiles 114 are still on the multiple launcher assembly 112, and the enabling of the launching of the missiles 114. In the preferred embodiment, the multiple missile launcher assembly 112 is a suitably modified LAU-7/A series missile launcher that is semi-permanently fixed to the inner surface of the high volume ordnance pod 16 housing. The missiles 114 are suspended on specific launcher rails of the missile launcher assembly 112 by the utilization of three hanger devices installed on each of the missiles 114 casing. The missiles 114 are linked to the internal stores management and control systems of the aircraft 11 through specific umbilical cords for the provision of power and carrying digital and addressing signals between the missiles 114 and the onboard computer device. The triple missile launcher 112 incorporated into the high volume missile launcher pod 16 includes a housing assembly, a nitrogen receiver, a mechanism assembly, and an electrical harness assembly. The housing assembly provides structural rigidity to the launcher assembly 112, and provides mounting points to mount the launcher 112 to the high volume missile launcher pod 16. The nitrogen receiver assembly stores high-pressure nitrogen used to cool the missiles 114 IR detector in the guidance system, the mechanism assembly includes an electro-mechanical device to hold the missiles 114 for takeoffs and landings and releases the missiles 114 for launching, and the electrical harness assembly consists of the appropriate connectors and wirings to interconnect between the aircraft 11 power source, the firing circuits and the launcher 112. The launching rails of the triple missile launcher assembly 112 are arranged in such a manner as to allow for three AIM-9 missiles 114 to be secured to the same assembly. If the flight control surfaces of the missiles 114 are not collapsible the angular difference between the positions of the launcher rails effects the suitable placement of the missiles 114 control wings and fins in respect to each other. Alternatively, if the missiles 114 flight control surfaces are collapsible to enable ready storage in the high volume missile launcher pod 16 then the surfaces are unfolded automatically immediately following the launch.

In order to store, deliver, control and fire the missiles 114 within the high volume missile launcher pod 16 suitable internal modifications should be made to the external fuel tank without changing the aerodynamic shape thereof. Additional functional modifications and/or additions are made to the HOTAS/SCC components in an ergonomically optimal manner. Further modifications are made in the appropriate SMS program routines implemented in the aircraft computer. For redundancy secondary control systems are provided to control and fire the missiles, and to jettison the high volume missile launcher pod in emergency situations.

Obviously, the embodiment of system and method of the present invention described in the foregoing would provide in the framework of specifically selected and implemented stores configurations a significant increase in the number of offensive and defensive shots available to the aircraft's pilot. As a result both the offensive and defensive capabilities of the aerial vehicle would be substantially enhanced.

It would be easily perceived by one with ordinary skills in the art that the structure, operation, dimensions, weight, and quantities associated with the high volume missile launcher were provided in the foregoing are exemplary only and were introduced merely for the ready understanding of the second embodiment of the invention. In other version of the embodiment the number of missiles carried within the pod could be different and could depend on the size of the carried missiles.

Figure 4:
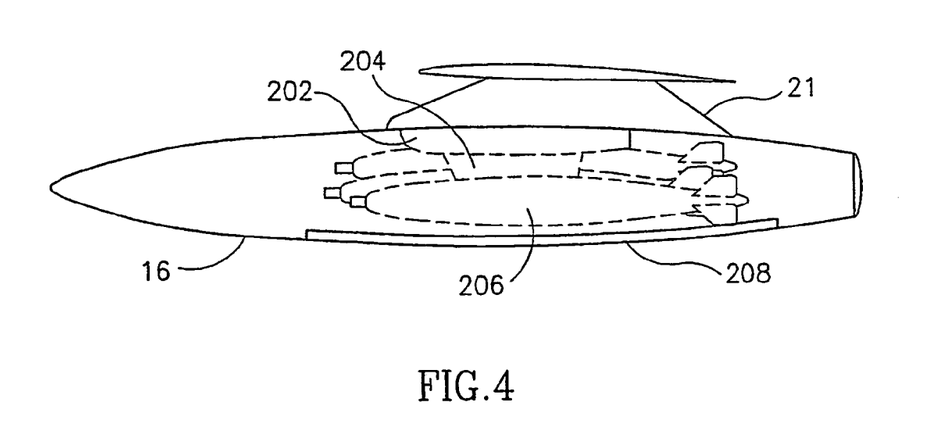
FIG. 4 is a cross-sectional side view of an external fuel tank converted into a substantially conformal heavy ordnance store pod uploaded on a weapon station of an aircraft, in accordance with the third preferred embodiment of the present invention.

Referring now to FIG. 4 illustrating a standard external fuel tank, such as a standard 600-gallon fuel tank, that was converted into a substantially conformal high volume heavy ordnance pod 16. The pod 16 accommodates a triple bomb ejector rack assembly 202, in accordance with the third preferred embodiment of the present invention. The high volume heavy ordnance pod 16 is shown uploaded on a pre-determined weapon station of an F-16 fighter aircraft. A Triple Ejector Rack (TER) 204 is a weapon suspension unit that attaches to an aircraft 11 pylon 21, and that can carry up to three weapons, such as the 250 lbs. Mk-81 free-fall bomb, or the 250 lbs. Smart Bomb System (SBS). The TER 204 is an accessory suspension aircraft armament equipment, which attach to a parent rack 202. The TER 204 consists of an adapter assembly, three ejector units, and a wiring harness. The TER is capable of carrying up to three stores secured to the ejector units. The two upper ejector unit has four adjustable sway braces and two mechanically locking suspension hooks while the lower ejector unit has two mechanically locking suspension hooks. Bombs 206 are suspended and secured to the Triple Ejector Rack 204 by two suspension lugs. Release is achieved by firing a charge that actuates a piston that forces the bomb 206 off the TER 204. The high volume heavy ordnance pod 16 that was converted from a standard external fuel drop tank includes three M-81 bombs 206 (or three SBS bombs) carried on three ejector units. The triple ejector rack assembly 204 provides side-by-side and canted side-by-side carriage and the release of three bombs 206. The housing of the high volume heavy ordnance pod 16 includes two oppositely outward opening bomb doors 208 that extend along the entire length of the high volume ordnance pod 16 in order to enable the loading of the bombs 206 into the high volume ordnance pod 16 and to allow the egress of the bombs 206 from the pod 16. The triple ejector rack assembly 204 used with the high volume heavy ordnance pod 16 could be a suitably modified BRU-42 TER that secured to the parent rack 202, which is semi-permanently fixed to the inner surface of the high volume heavy ordnance pod 16 housing. The bombs 206 are carried by specific suspension lugs that are integral part of the bombs 206 housing. The TER 204 is linked to the internal stores management and control systems of the aircraft through specific communication cables for the carrying of control signals between the TER 204 and the onboard computer.

The triple ejector rack assembly 204 incorporated into the high volume heavy ordnance pod 16 includes three TER stations (bottom, left, right), where each station is provided with suspension hooks, automatic sway braces, ejector foots, arming units, and the like. The stations are also fitted with zero retention solenoids and use ejection cartridge devices for store release and normal jettison. Primary or normal release utilizes two cartridge actuation devices that generate gas pressure to open the suspension hooks and eject the store away from the TER 202. Auxiliary release utilizes a separate cartridge actuation device to open the hooks only, providing gravity release of the store in case of primary ejector failure. To provide for the storage of the bombs 206 in the high volume heavy ordnance pod 16, the bombs aerodynamic stabilizer surfaces such as the tail surfaces could be made collapsible, set suitably into a folded state during storage and delivery and could be unfolded automatically subsequent to the their release.

In order to store, deliver, and release the bombs 206 in and from the high volume heavy ordnance pod, 16 suitable internal modifications should be made to the external fuel tank without changing the aerodynamic shape thereof. Additional modifications and upgrades are performed in the HOTAS/SCC components, and in the suitable SMS program routines implemented in the aircraft computer. For redundancy secondary control systems are provided to release the bombs 206 and to jettison the high volume heavy ordnance pod 16 in emergency situations.

Obviously, the embodiment of system and method of the present invention described in the foregoing would provide in the framework of specifically selected and implemented external stores configurations a significant increase in the number of ground attack means available the aircraft's pilot. As a result the ground interdiction capabilities of the aerial vehicle would be substantially enhanced.

The conversion of a conventional external fuel drop tank into a substantially conformal enhanced high volume external stores pod incorporating a multiple missile launching assembly or a heavy ordnance (iron bombs, SBS, and the like) release assembly, is advantageous in several respects. The payload capacity and the stores configuration versatility of the aerial vehicle will be substantially improved. The aerodynamic properties of the conventional external fuel tank are known and the use of the fuel tank as an external payload was thoroughly tested and certified for operational use for the specific aircraft. The weight of the stores assembly including the pylon, the high volume external ordnance pod, accommodating the ordnance carrier and the ordnance, is typically less than the weight of a fully loaded external fuel tank. Thus, the process of testing and acquiring certification for a stores configuration in which the high volume external stores pod alternatively replaces the original external fuel tank on a specific weapon station is substantially simpler, faster involving substantially lower costs and lower risks. In addition, the drag coefficient of a high volume ordnance pod is lower than the respective drag coefficient of an externally mounted heavy ordnance complex assembly (heavy ordnance carrier and suspended heavy ordnance). Furthermore a smaller radar signature and the infrared signature of the aircraft will be achieved.

It would be easily perceived by one with ordinary skills in the art that the structure, operation, dimensions, weight, and quantities associated with the heavy ordnance pod were provided in the foregoing are exemplary only and were introduced merely for the ready understanding of the second embodiment of the invention. The number of bombs accommodated in the heavy ordnance pod could differ in various versions of the proposed embodiment. For example, the triple ejector rack carrying three MK-81 bombs described in the foregoing could be replaced in other versions of the embodiment by a by a multiple ejector rack carrying six MK-81 bombs or by a vertical ejector rack carrying eight MK-81 bombs.

Figure 5:
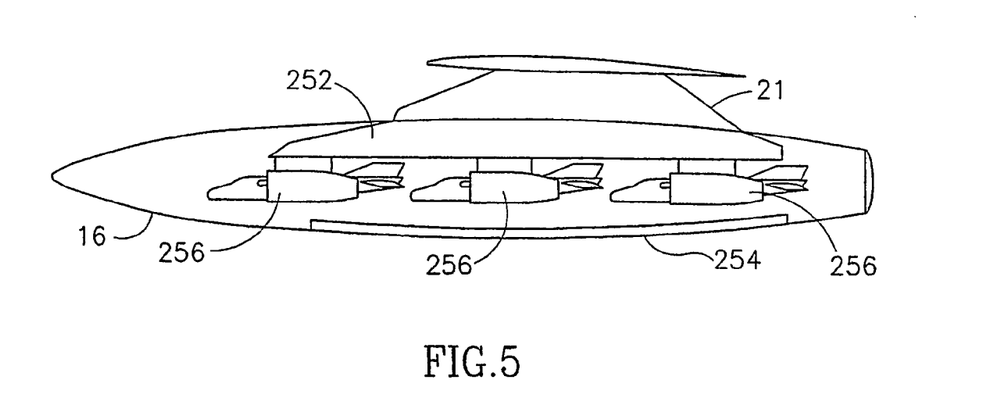
FIG. 5 is a cross-sectional side view of an external fuel tank converted into a substantially conformal Micro Aerial Vehicle (MAV) launcher pod uploaded on a weapon station of an aircraft, in accordance with the fourth preferred embodiment of the present invention.

Referring now to FIG. 5 illustrating a high volume microvehicle launcher pod 16, converted from and substantially conformal to a standard external fuel drop tank, such as a standard 370-gallon fuel tank and uploaded on a pre-determined weapon station of an F-16 aircraft. The high volume launcher pod 16 accommodates a Micro Aerial Vehicle (MAV) multiple ejector assembly 252, in accordance with the fourth preferred embodiment of the present invention. Micro Aerial Vehicles are known in the art as affordable, fully functional, remotely-piloted, militarily capable, small flight vehicles or aerial robots, whose mobility can deploy a useful micro payload to a remote or otherwise hazardous location where it may perform a variety of missions, including tactical or small unit reconnaissance and surveillance, support of military operations in urban terrain, targeting and tagging of high-value targets in denied areas, biological-chemical agent detection, search and rescue, and the like. The miniaturized payload of an MAV includes propulsion, remote and local flight control, and navigation systems, small video cameras, radiation sensors, chemical sensors, GPS, simple avionics, and a communication link sufficient to perform needed missions. MAVs are typically launched from ground-based barrel-launched munitions or from aerial vehicles.

Still referring to FIG. 5 the high volume MAV launcher pod 16 is secured to a pylon 21, which in turn is secured to a specific hard point on the underside of the wing of the aerial vehicle 11. The pod 16 includes a housing, which is practically identical to the housing of a 370-gallon external fuel drop tank from which the high volume MAV launcher pod 16 was converted. The housing is specifically strengthened up to compensate for the integration of the MAV carrier assembly 252 inside the pod 16 and provided with a pair of outward and downward opening MAV doors 254 to allow the egress of the MAVs 256 from the pod 16. The pod 16 includes an electromechanical door actuator assembly, such as one or more electrical motors, and a MAV carrier assembly 252 that is semi-permanently fixed to the internal surface of the housing. The MAV carrier 252 consists of a carrier covering assembly, three tether line assemblies, three rack assemblies for the carrying of the three separate MAVs 256, and mechanically locking suspension hooks on which the three MAVs 256 are suspended by suspension lugs installed in the casing thereof. A MAV is basically an uninhabited aerial vehicle. Therefore, it has a body designed to have an aerodynamic structure, and suitable flight control surfaces, such as wings, suitably collapsible in order to enable the storage of the MAVs 256 within the high volume ordnance pod 16. The internal components of the MAV 256 include an avionics system, a propulsion system, a power-supply system, a communication system, a navigation system, a remote control system, a local flight control system, and functional application-related systems, such as a image acquisition assembly, a sensor complex, and the like. The MAV 256 is connected to the internal control system of the carrier aircraft by an umbilical cord extending via the MAV carrier assembly 252, via the pylon 21, and via the pylon-airframe interface. The monitoring, controlling and launching of the MAV 256 is performed by the computer of the carrier aircraft 11, which is fed by control and launching data from the appropriate HOTAS/SCC components in the cockpit 40 of the aircraft 11. The SCC could incorporate a specifically designed MAV control panel including digital displays, illuminated push buttons, rotary switches and the like. The elements of the MAV control panel are displayed to and activated by the aircraft crew. The MAVs 256 are mechanically and electronically linked to the MAV carrier assembly 252 by tether lines incorporating a data link included in the tether assemblies. The data link is preferably a fiber optic cable, which is interconnected to the computer of the carrier aircraft 11. When the carrier aircraft 11 reaches the position, flight altitude, and airspeed suitable for an MAV launch, a specific MAV 256 is selected for launch, and an automatic sequence of pre-launch tests are initiated by the aircraft crew. The sequence of tests could include MAV communication system tests, MAV avionics tests, MAV power supply tests, MAV launch system tests, and the like. The tests are performed typically by pre-programmed routines implemented. in the carrier aircraft 11 computer and and/or by a suitably similar sub-set of pre-programmed routines implemented in the data processing system of the MAV 256. The MAV-side sub-set of routines will be further utilized during independent flight for periodical self-tests initiated either automatically or by the commands of a control station (ground-based, aerial or orbital) The results of the tests are transmitted via the data bus as electrical signals to be decoded and displayed to the aircraft crew. If the entire set of tests generate responses that indicate full functionality of the checked MAV systems then the aircraft crew initiates the primary stage of the MAV 256 launch from the MAV control panel by the suitable manipulation of the suitable control elements implemented in the MAV control panel that effect the sending of control data to the aircraft computer. The computer, in turn, transmits data signals, indicative of the selected MAV launch, to the MAV carrier assembly 252. The primary stage of the launching of the selected MAV 256 consists of the opening of the MAV doors 254 of the high volume ordnance pod 16, and releasing the MAV 256 from the MAV carrier assembly 252 by unlocking and opening of the mechanically locked suspension hooks. The MAV 256 separates from the MAV carrier 252, performs a gravity-assisted drop that effects egress of the MAV from the pod 16 (during which the umbilical cord is disconnected), and orientates down and aft relative to the carrier aircraft 11 while pulling along and extending the connected tether line that is controlled by a payout regulation mechanism in the tether assembly. The tether line includes the fiber optic data link cable to provide control for the secondary stage of the MAV 256 launch from the carrier aircraft 11. When the appropriate position of the MAV in respect to the carrier aircraft is achieved, the secondary launch stage is initiated either manually by the aircraft crew or automatically by the aircraft computer. Subsequently, the MAV's control and communication systems are activated, the flight-control surfaces of the MAV 256 unfold, the propulsion unit is ignited, the tether line is disconnected from the MAV 256, and the MAV 256 begins independent flight by turning away in a pre-programmed manner from the flight path of carrier aircraft 11. Subsequently the tether line is pulled back into the MAV carrier assembly 252 housing by a rotating tether line reel or other suitable means, and the MAV doors 254 of the high volume MAV launcher pod 16 are closed. The MAV launch system further includes a secondary control system for redundancy and an emergency system for the urgent release of an MAV 256 during crisis situations. In order to store, deliver, and eject MAVs 256 in, by and from the high volume launcher pod 16 suitable internal modifications should be made to the standard external fuel tank while preserving the aerodynamic characteristics thereof. Additional modifications and upgrades are made in the HOTAS/SCC components in an ergonomically suitable manner, and in the suitable SMS program routines implemented in the aircraft computer.

It would be readily perceived by one with ordinary skills in the art that the above described system and method of operation is exemplary only and was not meant to be limiting. The ejection and the launching of the MAV could be performed in a substantially different manner, the launcher pod, the MAV-carrier assembly, and the internal control system could include additional components. In addition, further components could be added, some components could be dispensed with or could be combined to share functionality. For example, the MAVs could be removed from the launcher pod by a suitably structured mechanical arm. The fiber optic data link associated with the tether line could be dispensed with and the secondary stage of the launch could be initiated either automatically or by commands relayed wirelessly. The number of MAVs carried in the pod, and the relative deployment of the MAVs in respect to each other could differ and could depend on the size of the carried vehicles and the size of the high volume MAV launcher pod. For example, in different version of the embodiment six or eight MAVs could be carried within the MAV launcher pod suspended on a suitably configured multiple MAV carrier assembly.

Figure 6:
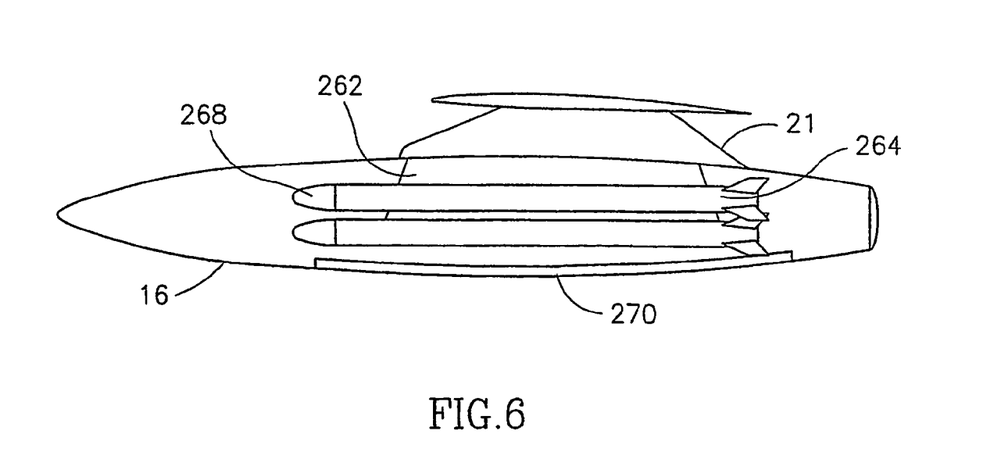
FIG. 6 is a cross-sectional side view of an external fuel tank converted into a substantially conformal micro-satellite (MicroSAT) launcher pod uploaded on a weapon station of an aircraft, in accordance with the fifth preferred embodiment of the present invention.

Reference is made now to FIG. 6 that illustrates a high volume micro-satellite (MicroSAT) launcher pod 16 converted from and substantially conformal to a conventional external fuel drop tank, such as a standard 600-gallon fuel tank and uploaded on a pre-determined weapon station of an F-16 aircraft. The high volume MicroSAT launcher pod 16 accommodates a micro-satellite launching assembly 262, in accordance with the fifth preferred embodiment of the present invention. Micro-satellites are known in the art as small, agile, compact and lowcost satellites weighing less than about 100 lbs. that could be used for a variety of military, civilian and scientific applications. Micro-satellites are typically equipped with onboard avionics, communications, propulsion and image acquiring systems. Thus, micro-satellites could carry high-resolution video cameras, UHF, VHF, S band and L band transmitters, a data storage and delivery system, onboard telemetry and computing systems, where the systems are powdered by rechargeable batteries, fuel cells, or solar cells. The applications of the micro-satellites include communications, surveillance and data transfer, such as monitoring of environmentally sensitive areas, assisting in weather forecasting, and conveying important surveillance and tactical information from a battlefield. Micro-satellites can be delivered to low-earth orbit by the launching of the microsatellites from diverse platforms such as traditional ground-based rocketlaunchers (carried by, for example, the McDonnell Douglas Delta II rocket), guns, surface ships, submarines, and diverse aerial vehicles such as a high-flying balloons or a high-flying aircraft. In addition, micro-satellites could also be deployed in orbit by the being ejected from an orbiting mother ship satellite. The advantage of utilizing a high-flying aerial vehicle, such as an aircraft as a microsatellite launching platform regards the provision of a very rapid, substantially cost-effective and substantially clandestine deployment. Typically an aerial vehicle, such as an aircraft carrying one or more orbital delivery vehicles, such as specifically programmed rockets accommodating one or more micro-satellites, ascends to an altitude of about 40,000 feet, initiates the performance of a set of functional pre-launch checks on the launching system, delivery vehicles status, and micro-satellites functionality, and launches the delivery vehicles carrying the micro-satellites. The engines of the rockets are ignited and in accordance with a pre-programmed flight path the delivery vehicles ascend to an altitude of about 400 miles. Subsequently, the micro-satellites are ejected from the delivery vehicles in the manner known in the art and enter low-earth orbit. Subsequent to the establishment of a communication path with the satellites by a Ground Control Station (GCS) or by an Orbital Control Station (OCS) the pre-designed applications and functions implemented in the micro-satellites are activated in accordance with pre-programmed procedures and/or in accordance with specifically transmitted commands communicated by the GCS or the OCS.

Still referring to FIG. 6 the high volume MicroSAT launcher pod 16 is secured to a pylon 21, which in turn is secured to a specific hard point on the underside of the wing of the aerial vehicle 11. The pod 16 includes a housing, which is substantially identical to the housing of a standard 600-gallon external fuel drop tank from which the high volume MicroSAT launcher pod 16 was converted. The housing is specifically strengthened up to compensate for the integration of the MicroSAT launcher assembly 262 inside the pod 16 and is provided with one or more oppositely located outward and downward opening MicroSAT ejection doors 270 to enable the egress of the micro-satellite delivery rockets (MSDR) 264 from the ordnance pod 16. The pod 16 includes an electromechanical door actuator assembly, such as one or more electrical motors, and a MSDR launcher assembly 262 that is semi-permanently fixed to the internal surface of the housing. The MSDR launcher 262 consists of a launcher covering assembly, and two launcher rails for the carrying of the two separate MSDRs 264. An MSDR 264 consists of a rocket housing, a propulsion system, an onboard navigation control system, and a suitably secured and sheltered MicroSAT 268 typically located at the fore part of the rocket 264. The MicroSAT 268 includes an avionics system, a propulsion system, a power-supply system, a communication system, a navigation system, a remote control system, and functional application-related systems, such as an EO sensor assembly, and the like. The MSDR 264 is connected to the internal store management and control system of the carrier aircraft 11 by an umbilical cord extending via the MicroSAT launcher assembly 262, via the pylon 21, and via the pylon-airframe interface. The monitoring, controlling and launching of the MSDR 264 are performed by the computer of the carrier aircraft 11, which is fed control and launch data by the HOTAS/SCC components in the cockpit 40 of the aircraft 11. The SCC could incorporate a specifically designed MSDR control panel including digital displays, illuminated push buttons, rotary switches and the like. The elements of the MSDR control panel are displayed to and activated by the aircraft crew. When the carrier aircraft 11 reaches the suitable flight altitude, such as about 40,000 feet, for a MicroSAT launch, a specific MicroSAT 268 is selected for launch, and an automatic sequence of pre-launch tests are initiated by the aircraft crew. The sequence of tests could include MicroSAT communication system tests, avionics tests, power supply tests, launch system tests, and the like. The tests are performed typically by pre-programmed routines implemented in the carrier aircraft 11 computer and/or by a specific sub-set of the routines implemented in the data processing system of the MicroSAT 268. The satellite-side routines will be further utilized during the independently conducted atmospheric flight and space flight for periodical self-tests initiated automatically or by the commands of a GCS or an OCS. The results of the tests are transmitted via the data bus as electrical signals to be decoded and displayed to the aircraft crew. If the tests generate responses indicative of full functionality of the checked MicroSAT 268 systems then the aircraft crew initiates the MSDR 264 launch by the manipulation of the appropriate HOTAS/SCC components that effect the sending of control data to the aircraft computer. The computer, in turn, transmits data signals, indicative of the selected MicroSAT 268 launch, to the MicroSAT launcher assembly 262. The launching of the selected MSDR 264 consists of the opening of the doors 270 of the high volume launcher pod 16, and activating the propulsion unit of the MSDR 264.

The force exerted by the propulsion unit of the MSDR 264 effects the separation of the MSDR 264 from the MicroSAT launcher rails. The MSDR 264 exits the pod 16 (during which the umbilical cord is disconnected), accelerates, and subsequent to achieving a pre-determined safe distance from the carrier aircraft ascends along a pre-programmed flight path to an altitude about 400 miles. Consequently, in accordance with the pre-programmed MicroSAT delivery procedure, the MicroSAT 268 secured on the aft part of the MSDR 264 is ejected and enters a predetermined low-earth orbit in a manner known in the art. After the successful launch the MicroSAT doors 270 of the high volume MicroSAT launcher pod 16 are closed. The MicroSAT launch system further includes a secondary control system for redundancy and an emergency system for jettisoning of the pod 16, and/or the pylon 21 during crisis situations. In order to store, deliver, and launch the MicroSATs 268 in, by and from the high volume MicroSAT launcher pod 16 suitable internal modifications should be made to the standard external fuel tank without changing the aerodynamic shape thereof. Additional modifications and upgrades made on the appropriate HOTAS/SCC components in an ergonomically optimal manner, and in the appropriate SMS program routines of the aircraft computer.

It would be readily perceived by one with ordinary skills in the art that the above described system and method of operation is exemplary only and was not meant to be limiting. The launching of the MSDR could be performed in a substantially different manner, the MicroSAT launcher pod, the MicroSAT launcher assembly, and the internal stores management and control system could include additional components. In addition, further components could be added, some components could be dispensed with or could be combined to share functionality. For example, the MSDR could be ejected from the MicroSAT launcher pod by gravity-assist, or by a suitably structured mechanical arm, and the like. In the case of the gravity-assist drop a tether line similar to the one described in association with the MAV launching could be used The number of MSDRs carried in the MicroSAT launcher pod could differ and could depend on the size of MicroSAT, the size of the associated MSDR, and the size of the MicroSAT launcher pod.

Figure 7:
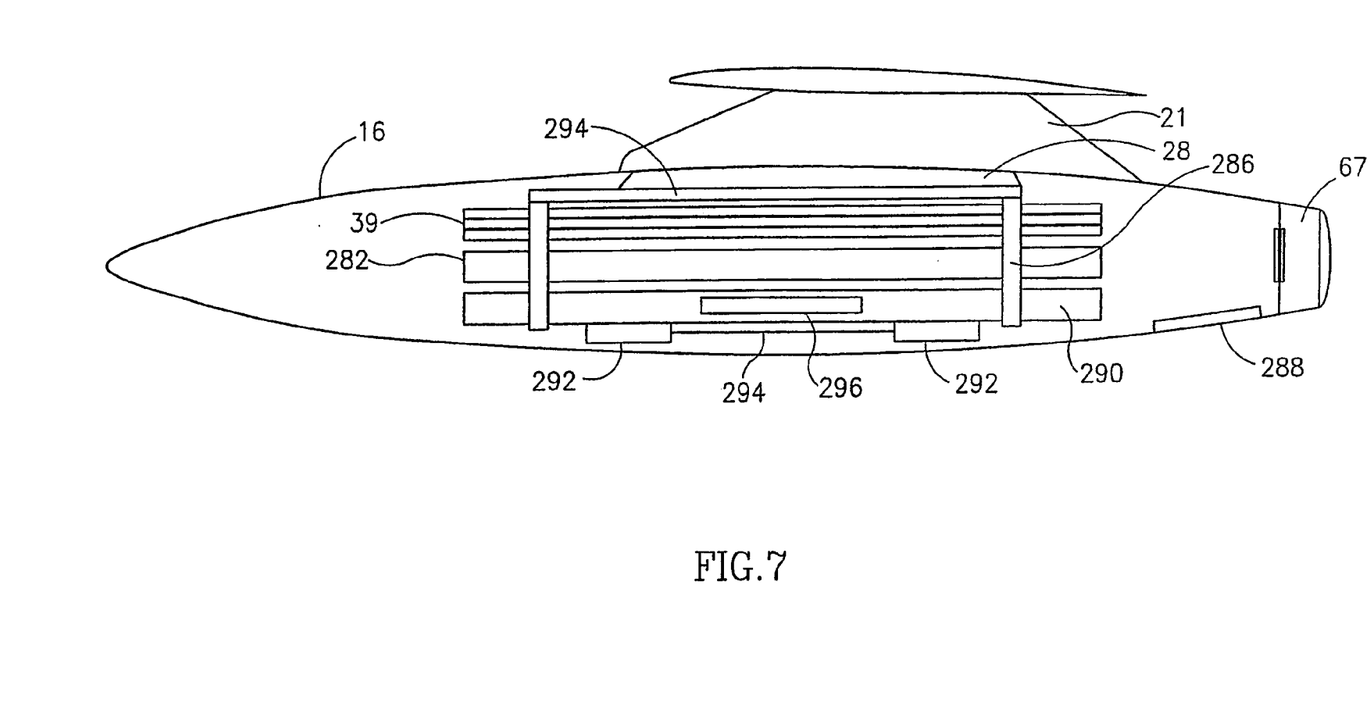
FIG. 7 is a cross sectional side view of an external fuel tank converted into a substantially conformal multi-payload pod uploaded on a weapon station of an aircraft, in accordance with the sixth preferred embodiment of the present invention.

Referring now to FIG. 7 that shows a high volume multi-payload pod converted from and substantially conformal to a standard external fuel drop tank, such as a standard 600-gallon fuel tank, and uploaded on a predetermined weapon station of an F-16 aircraft. The high volume multi-payload pod accommodates a multi-payload stores complex, in accordance with the sixth preferred embodiment of the present invention. The high volume multi-payload pod 16 of the current embodiment is operative in the implementation of a tactical aerial reconnaissance mission in a combat area where potential radar directed and/or infrared directed threats exist. The multi-payload stores complex comprises an expendable electronic counter measures assembly (EECMA) 291, which includes a high volume chaff dispenser 39 for protection against radar directed threats, an infrared decoy flare dispenser 282 to protect the aircraft against infrared directed missiles, and a tactical air reconnaissance assembly (TARA) 290, such as one or more EO sensors to collect visual information and an associated digital imaging system for the transmission of real-time imagery to a ground-based command center, an airborne command center, or a communications relay.

The high volume multi-payload pod 16 includes a housing having a modular construction that is substantially equivalent in shape to the housing of a standard external fuel drop tank. Specific functional modifications were made on the housing such as the addition of service panels 24 for routine maintenance, the addition of chaff/flare dispersal doors 288 for allowing for the dispersion of chaff/infrared decoy flares, and the option of re-moving the aft modular section 67 of the housing to enable routine maintenance, chaff/flare unloading and re-loading procedures. The housing was also specifically strengthened up to handle the loads associated with accommodation of the combined EECMA 284, and TARA 290 therein. The internal structure of the standard external fuel drop tank is substantially re-structured in order to provide space for the EECMA/TARA assemblies 284, 290. The EECMA 284 is semi-permanently fixed to the internal surface of the pod housing and includes a revolving rack 286, a high volume chaff dispenser 39, an infrared decoy flare dispenser 282, and an electrical control box 294. The high volume chaff dispenser 39 and the infrared decoy flare dispenser assembly 282 are mechanically coupled to the revolving rack 286 such that 180 degree revolving movement of the rack 286 in a specific direction effects the re-positioning of either the chaff dispenser 39 or the of the infrared decoy flare assembly 282 opposite the chaff/flare dispersal doors 288. The movement of the rack 286 further involves the setting of the chaff dispenser 39 or the infrared decoy flare dispenser 282 into an armed/unarmed state according the location of the dispensers 39, 282. Thus, when consequent to the revolving movement of the rack 286 the chaff dispenser 39 re-positioned opposite the doors 288 the chaff dispenser 39 is armed and the infrared decoy flare dispenser 282 is unarmed by the activation of one or more position sensors that send an indicative signal to the electric control box 294. In contrast, when consequent to the revolving movement of the rack 286 the infrared decoy flare dispenser 282 is repositioned opposite the doors 288 the infrared decoy flare dispenser 282 will be armed and the chaff dispenser 39 will be unarmed by the activation of one or more position sensors that send an indicative signal to the control box 294.

The movement of the revolving rack 286, the firing of either one or more chaff packages from the chaff dispenser 39 or the firing of one or more infrared decoy flares from the infrared decoy flare dispenser 282 is controlled by the aircraft crew, via a chaff/flare control panel in the cockpit 40 of the aircraft 11 consequent to the identification of a radar directed or infrared directed threat. The movement of the rack 286 could be controlled also automatically by the computer of the aircraft 11 consequent to signals indicative of the specific threat, which are received from the suitable ECM pod 20 of FIG. 1. The control data signals operative in the revolving movement of the rack 286 are transmitted by the aircraft computer via a suitable data bus to the pylon-airframe interface, to the pylon 21, to the multi-payload pod 16, to the control box 294, and to the revolving rack 286 actuator mechanism, the chaff dispenser 39, and the infrared decoy flare dispenser 282, respectively. Signals indicative of the status of the ordnance pod 16, the EECMA 284 and the TARA 290, such as the situation of the dispersal doors 288, the quantity of chaff/flares available, and the like, are transmitted in the reverse direction from the pod 16 to the SCC via the data bus, and via the aircraft computer.

The structure, functionality and operation of the high volume chaff dispenser 39 were described in detail in association with the first preferred embodiment of the present invention and therefore will not be described hereunder. The structure, functionality and operation of the infrared decoy flare dispenser 282 are substantially equivalent to the existing infrared decoy flare dispensers known in the art.

The TARA 290 is semi-permanently fixed to the internal surface of the housing independently of the EECMA 284. The TARA 290 includes one or more EO sensors, such as high-resolution cameras (both still frame and video) 292 to collect visual information, such as, for example, battle damage assessment (BDA) data, associated signal encoders/decoders to convert the analog data received from the cameras 292 into digital format, and an image storage and processor device 296, such as a microprocessor, with appropriate software implemented therein to store, process and transmit the images via a specific data link to the computer of the carrier aircraft 11 to be prepared for transmission to a ground command center, an airborne command platform, or a suitable communication relay. The commands operative in the activation, and de-activation of the EO sensors 292, in the activation, and de-activation of the image processing system 296, and the initiation or the termination of the uploading process operative in the transmission of the processed images to the aircraft computer are also communicated to the high volume multi-payload pod 16 from the aircraft crew manipulating the control elements implemented in a specific TARA control panel associated with the SCC in the cockpit 40 of the aircraft 11. Some of these procedures could also be automatic in accordance with the setting of specific control components, such as selector switches, implemented in the TARA control panel associated with the SCC in the cockpit 40 of the aircraft 11.

In order to store, deliver, control, and operate the multi-payload ordnance assembly in the multi-payload pod 16, designed to counter radar directed and infra directed threats, to manage tactical reconnaissance, tactical information processing and real-time delivery, suitable internal modifications should be made to the standard external fuel tank designed to accommodate the assembly without significantly modifying the aerodynamic shape thereof. Additional modifications and upgrades are made in the relevant HOTAS/SCC components, in the relevant SMS program routines implemented in the aircraft computer, and in various weapon station-related control system units, such as multiplexers, de-multiplexers, encoders, decoders, and the like.

It would be readily perceived by one with ordinary skills in the art that the above described system and method of operation is exemplary only and was not meant to be limiting. The structural arrangement of the multi-payload stores complex could be performed in a substantially different manner, the multi-payload pod, the EECMA system, and TARA system could include additional components, such as Infrared (IR, still frame), synthetic aperture radar (SAR), and onboard recorder capabilities to capture wide area search imagery. In addition, further components could be added, some components could be dispensed with or could be combined to share functionality. For example, the TARA could include a specific sensor assembly designed to detect the presence of biological or chemical threat on the ground under surveillance, an autonomous data communications assembly, comprising an ultra high frequency/Ku-band satellite communication link, a transmitter/receiver, an encoder/decoder, an antenna, and the like, could be added in order to pass highly accurate real-time information to one or more ground control stations (GCS) or airborne command and control platforms independently of the aircraft's computer, and the like.

The high volume stores pod proposed by the system and method of the present invention utilize existing hard points on the external surface of the aircraft. Note should be taken that the existing hard points adapted to the attachment of a pylon carrying a high volume stores pod retain their original alternative functionalities, such as, for example, the support of a conventional external fuel tank complex. Thereby the option of suspending an externally mounted additional fuel store on the particular hard point and maintaining the fuel flow communication between the suspended external fuel store and the engine of the aircraft is still assured.

The advantages inherent in the system and method proposed by the present invention were amply demonstrated by the foregoing description of the six preferred embodiments. It would be easily perceived by one with ordinary skill in the art that all the embodiments are exemplary only. The system and method of converting a conventional external fuel drop tank into a substantially conformal high volume external stores pod allows for a plurality of alternative internal and external formations, options, versions, configurations, arrangements, and applications. The foregoing descriptions were provided, only for enabling a ready understanding of the concepts underlying the present invention and should not be interpreted in as limiting.

Therefore, it will be appreciated by persons with ordinary skills in the art that the present invention is not limited to what has been particularly shown and described hereinabove. The scope of the present invention is defined only by the claims, which follow.

The invention claimed is:

1. A system for mounting a load on an aerial vehicle, the system comprising:
   an aerodynamically shaped structure mounted on the exterior of an aerial vehicle; said aerodynamically shaped structure substantially surrounds at least one airborne store;
   interior airborne store mounting means attached to the internal surface of the aerodynamically shaped enclosure to provide stability to the at least one airborne store;
   airborne store operation control means linked to the aerodynamically shaped structure to monitor and control the operation of the at least one airborne store;
   airborne store operation support means to provide for the release of the at least one airborne store during flight responsive to instructions by said airborne store operation control means; and
   wherein said aerodynamically shaped structure is shaped the same as a fuel tank designed for use with the aerial vehicle and is mounted on the exterior of the aerial vehicle in the position in which a fuel tank of the same shape would be placed.

2. The system according to claim 1 wherein the aerodynamically shaped structure is a modified fuel tank attachable to the exterior of aerial vehicle.

3. The system according to claim 2 wherein the modified fuel tank is structurally strengthened up to maintain its aerodynamic shape and characteristics during flight, to manage loads associated with the suspension, storage, delivery and release of the at least one airborne store mounting means, the at least one airborne store control means, the at least one airborne store support means and the at least one airborne store.

4. The system according to claim 2 wherein the modified fuel tank is of modular construction.

5. The system according to claim 2 wherein the modified fuel tank is a standard external fuel drop tank.

6. The system according to claim 5 wherein the standard external fuel drop tank is a 370-gallon fuel tank.

7. The system according to claim 1 wherein the at least one airborne store mounting means is an expendable electronic counter measure magazine.

8. The system according to claim 1 wherein the at last one airborne store mounting means is a multiple missile launcher.

9. The system according to claim 1 wherein the at least one airborne store support means is a multiple bomb ejector.

10. The system according to claim 1 wherein the at least one airborne store mounting means is multiple miniature aerial vehicle launcher.

11. The system according to claim 1 wherein the at least one airborne store mounting means is a multiple micro-satellite launcher.

12. The system according Co claim 1 wherein the at least one airborne store operation control means comprises communication media to interconnect the at least one airborne store to the stores management and control system of the aerial vehicle.

13. The system according to claim 1 where the at least one airborne store operation support means comprises the elements of:

at least one airborne store loading and reloading access door;

at least one airborne store release door.

14. The system according to claim 1 wherein the at least one airborne store is an expendable electronic counter measure device.

15. The system according to claim 14 wherein the expendable electronic counter measure device is chaff.

16. The system according to claim 1 wherein the at least one airborne store is an aerodynamic missile.

17. The system according to claim 1 wherein the at least one airborne store is an aerial bomb.

18. The system according to claim 1 wherein the at least one airborne store is a miniature aerial vehicle.

19. The system according to claim 1 wherein the at least one airborne store is a micro-satellite.

20. The system according to claim 1 wherein the at least one airborne store is a multi-payload airborne store comprising the elements of:

an expendable electronic counter measure dispenser; and a tactical reconnaissance assembly.

21. The system according to claim 1 wherein the at least one airborne store is a missile.

22. The system according to claim 1 wherein the aerodynamically shaped structure comprises a chaff or Flare dispenser pod.

23. The system according to claim 1 wherein the aerodynamically shaped structure comprises a missile launcher pod.

24. The system according to claim 1 further comprises secondary control, monitoring, and emergency release means.

* * * * *